(12) United States Patent
Thorman et al.

(10) Patent No.: US 7,461,088 B2
(45) Date of Patent: Dec. 2, 2008

(54) SUPERSET FILE BROWSER

(75) Inventors: Christopher P. Thorman, Redwood City, CA (US); Michael V. Stein, San Jose, CA (US)

(73) Assignee: Apple Inc., Cupertino, CA (US)

( * ) Notice: Subject to any disclaimer, the term of this patent is extended or adjusted under 35 U.S.C. 154(b) by 718 days.

(21) Appl. No.: 10/737,055

(22) Filed: Dec. 15, 2003

(65) Prior Publication Data

US 2005/0131959 A1 Jun. 16, 2005

(51) Int. Cl.
  G06F 17/30 (2006.01)
(52) U.S. Cl. .................. 707/104.1; 707/1; 707/102
(58) Field of Classification Search ............ 707/1, 707/102–104.1, 10, 100, 200, 103 R–103 Z; 709/203
  See application file for complete search history.

(56) References Cited

U.S. PATENT DOCUMENTS

| | | | | |
|---|---|---|---|---|
| 5,187,786 | A * | 2/1993 | Densmore et al. | 707/3 |
| 6,327,608 | B1 * | 12/2001 | Dillingham | 709/203 |
| 6,393,429 | B1 * | 5/2002 | Yagi et al. | 707/102 |
| 6,868,424 | B2 * | 3/2005 | Jones et al. | 707/102 |
| 7,177,935 | B2 * | 2/2007 | Bradshaw et al. | 709/226 |
| 2003/0084096 | A1 * | 5/2003 | Starbuck et al. | 709/203 |
| 2003/0163519 | A1 * | 8/2003 | Kegel et al. | 709/203 |
| 2004/0070608 | A1 * | 4/2004 | Saka | 345/748 |
| 2004/0078358 | A1 * | 4/2004 | Hughes et al. | 707/3 |

OTHER PUBLICATIONS

A. Taivalsaari, "Multidimensional browsing", Software Engineering Environments, Eighth Conference on, Apr. 8-9, 1997, pp. 11-22.*
Hubert W.J. Borst Pauwels et al., "Carpe Diem: a multimedia file browser editor for files stored on LANs", Multi Media Engineering Education, IEEE International Conference, Jul. 3-5, 1996, pp. 523-532.*
Peter Pirolli et al., "The Effects of Information Scent on Visual Search in the Hyperbolic Tree Browser", ACM Transactions on Computer-Humann Interaction (TOCHI), Mar. 2003, pp. 20-53.*
H. Oswald, R. Esser, and R. Mattmann, "An Environment for Specifying and Executing Hierarchical Petri Nets", Proceedings of teh 12th international conference on Software engineering, Feb. 1990, pp. 164-172.*
Hemang Lavana, Amit Khetawat, and Franc Brglez, "Internet-based Workflows: A Paradigm for Dynamically Reconfigurable Desktop Environments", Proceedings of the international ACM SIGGROUP conference on Suppoting group work: the integration challenge, Nov. 1997, pp. 204-213.*

* cited by examiner

*Primary Examiner*—Cheryl Lewis
(74) *Attorney, Agent, or Firm*—Wong, Cabello, Lutsch, Rutherford & Brucculeri, L.L.P.

(57) ABSTRACT

A superset file browser permits a user to view, in a single display, the superset (i.e., the set union) of file objects from two or more designated file system locations (i.e., directories) on one or more computer systems (local or remote). The uniqueness, or overlap, of file objects between the different designated locations is indicated graphically—typically through the use of different colors and/or icons, alphanumeric labels, popup text, ToolTip text or a combination of these techniques. A superset file browser also permits one-to-many and many-to-many distribution, collection and synchronization operations on the displayed file objects.

76 Claims, 8 Drawing Sheets

SUPERSET FILE BROWSER

BACKGROUND

The invention relates generally to computer systems and more particularly, but not by way of limitation, to a graphical user interface for displaying the set union of file objects (files and directories) from multiple client computer systems in a single file browser display.

As computer system technology has matured (hardware and software), the use of computer system networks has increased. As used herein, a computer network comprises a plurality of computer systems (e.g., workstations, servers and personal computers) coupled through a communication medium. For example, an organization may implement a local area network ("LAN") internally while also providing access to a wide area network ("WAN")such as the Internet or a company-wide leased line. Connectivity between different computer systems in a network may be made via a combination of physical or wireless technologies.

Organizations typically employ experts, referred to as system administrators, to monitor and maintain their computer networks. One task of a system administrator is to set-up or configure computer systems for other users. In this context, a computer's configuration refers to its operating system capabilities and features as well as the user applications and operational parameters associated with the use of these applications and operating systems. For operational and cost efficiency, it is often desirable that all computers assigned to a group of users (e.g., students in a computer lab and employees in a common department) be configured identically. This, in turn, frequently requires a system administrator to compare the contents of one computer's file system with the content and structure of other file systems and, often, further involves moving and/or copying files (including directories) from a first location to a second location. As used herein, a "file system" is the ordered collection of files and directories stored on one or more storage units (e.g., floppy drives, magnetic and optical disk drives, disk partitions and logical drives) maintained, administered and controlled by a given operating system instance.

Most modern computer systems provide a graphical user interface (GUI) application through which a user may view the structure and content of her file system (e.g., a "file browser"). File browser applications also generally permit the user to view the structure and content of remote file systems if they are mounted to the user's system. In one embodiment (see FIG. 1), prior art file browser application 100 permits a user to view the structure and content of mounted (local or remote) file systems. As shown, the structure and content of remote computer system Feynman 105 and local storage unit "Macintosh HD" 110 may be seen. Further, by selectively activating the triangular icons/buttons to the left of individual directories a user may "step down" into the file system—displaying file and directory objects that are "under" the current level. For example, it can be seen that storage unit 110 includes "AppleWorks 6 Updater Log" file object 115 and a number of directory objects or folders, e.g., Applications folder 120 and Documents folder 125. One drawback with a file browser application in accordance with FIG. 1 is that it is difficult to compare the contents of specific directories unless they are fortuitously displayed one right under the other and they each contain a sufficiently small number of objects that they can be displayed on less than a single screen. This difficulty is insurmountable when the contents of three or more locations are to be compared.

In another embodiment (see FIG. 2), prior art file browser application 200 permits a user to view and compare the contents of two directories (on the same or different computer systems) in a single display window, albeit with the contents of each selected location in a separate pane. For example, the contents of Computer-1's 205 Application directory 210 is shown in pane 215, while the contents of Computer-2's 220 Application directory 225 is shown in pane 230. While this technique permits the side-by-side comparison of two directory structures, it nevertheless requires a user (e.g., a system administrator) to individually compare the contents of each directory. For example, Computer-1's Application directory 210 contains 62 items while Computer-2's Application directory 225 contains only 28. Which of the 28 are common to the two directories is not easily discernable. Further, the technique of FIG. 2 is not applicable when more than two locations are to be compared.

In yet another embodiment, multiple file browser application instances may be used simultaneously to display the content of multiple locations. For example, three (3) file browser applications in accordance with FIG. 1 may be used to display the contents of three different file system locations (i.e., directories) so that they may be compared (once aligned side-by-side). Similarly, one file browser application in accordance with FIG. 1 and one file browser application in accordance with FIG. 2 may be used to display the contents of three different directories so that they may be compared (once aligned side-by-side). It will be recognized that such combination techniques do not provide a convenient or easy means to simultaneously view the contents of multiple file system locations and are further limited to the number of display windows that may be arranged one next to the other on the user's video display unit.

Thus, it would be beneficial to provide a means to permit users to easily compare the contents of multiple locations using a single file browser application and further, to facilitate the movement of file and/or directory objects from one location to another (e.g., copy, move-and-delete and synchronization operations).

SUMMARY

In one embodiment the invention provides a method to display the set union of file objects (files and directories) from a plurality of locations in a single window. The method includes designating a plurality of file system locations, wherein each file system location is associated with zero or more file objects, and displaying the superset of the file objects associated with each of the designated file system locations in a single display window. The uniqueness, or overlap, of file objects between the different designated locations may be indicated graphically, typically through the use of different colors (including grayscales), different icons, variations in font styles, highlighting, translucency, alphanumeric labels, popup text, ToolTip text or a combination of these, or similar, techniques.

In another embodiment, an object displayed in accordance with the invention may be synchronized between all of the designated locations with a single command operation. In yet another embodiment, a file object displayed in a conventional file browser application may be copied and/or merged to each of the designated locations displayed in accordance with the invention with a single command operation. In still another embodiment, dragging a file object displayed in accordance with the invention to a location different from any of the designated locations, causes a copy of the file object from each designated location at which it exists to be copied to that location. Methods in accordance with the invention may be stored, as program instructions, in any medium that is readable and executable by a programmable control device.

DETAILED DESCRIPTION

Techniques (methods and devices) to display the superset of file system contents from two or more designated locations (i.e., directories) are described. As used herein, the term "superset" means the file object overlap or set union of two or more file system locations. The following embodiments of the invention, described in terms of a superset file browser application compatible with computer systems manufactured by Apple Computer, Inc. of Cupertino, Calif., are illustrative only and are not to be considered limiting in any respect.

A file browser in accordance with the invention provides a graphical display of the superset of file system content from two or more designated locations. In one embodiment each displayed object visually indicates its uniqueness among, or overlap between, the designated locations. For example, an object (file or directory) that is present in all of the designated locations may be displayed in a first color, those objects present in only one of the designated locations may be displayed in a second color and those objects present in more than one, but less than all, designated locations may be displayed in a third color. In another embodiment, file object overlap may be displayed using a table structure, including a three dimensional table structure with, or without, translucency. In yet another embodiment, objects having the same name but different characteristics (e.g., file size, ownership, access privileges, and modification or creation times) may also be visually distinguished. In still another embodiment, different icons and/or alphanumeric labels may be used to visually distinguish the overlap of file objects between the two or more designated locations. For example, if a file browser in accordance with the invention is displaying the superset of objects from four designated locations in which the file "tmp.txt" is present in three of the four designated locations, this may be visually indicated by displaying a "3" or "(3)," a "¾" or"(¾)," or a "75%" or "(75%)" after the file name. Similarly, "popup" or "ToolTip" information tags or text indicating how many locations and/or where a displayed object exists and/or its unique characteristics (e.g., size) among the designated locations may be generated when commanded by the user or when a pointer device (e.g., a "mouse") is positioned over the displayed object. Other display options are possible and readily identified by those of ordinary skill in the art.

Figure 3A:
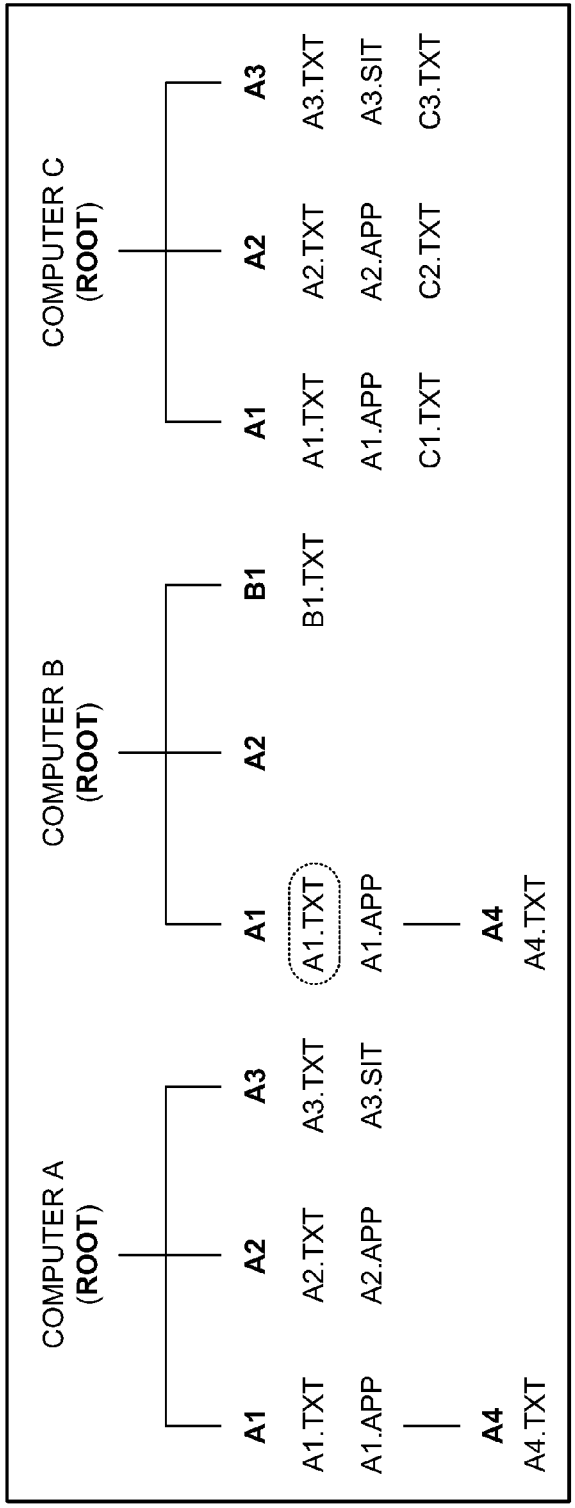
FIG. 3 schematically illustrates the file structures associated with three computer systems (FIG. 3A), the superset of the root directory of the three file systems (FIG. 3B) and the superset of a designated subdirectory of the three file systems (FIG. 3C).

As a preliminary matter, consider the three file system structures illustrated in FIG. 3A. As shown, Computer-A's file system consists of a root level having three directories: A1, A2 and A3, where Directory A1 comprises two files (A1.txt and A1.app) and one subdirectory (A4)—itself having one file (A4.txt), directory A2 comprises two files (A2.txt and A2.app), and directory A3 comprises two files (A3.txt and A3.sit). Computer-B's file system also consists of a root level having three directories: A1, A2 and B1, where directory A1 includes the same two files and one directory as does directory A1 on Computer-A with some characteristic of file A1.txt being different (denoted by a dashed enclosure), directory A2 includes no files, and directory B1 includes one file (B1.txt). Similarly, Computer-C's file system consists of a root level having three directories: A1, A2 and A3, where directory A1 includes three files (A1.txt, A1.app and C1.txt), directory A2 includes three files (A2.txt, A2.app and C2.txt), and directory A3 includes three files (A3.txt, A3.sit and C3.txt).

Figure 3C:
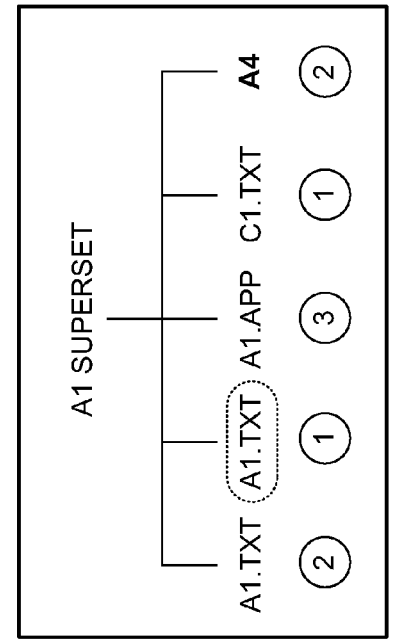
Figure 3B:
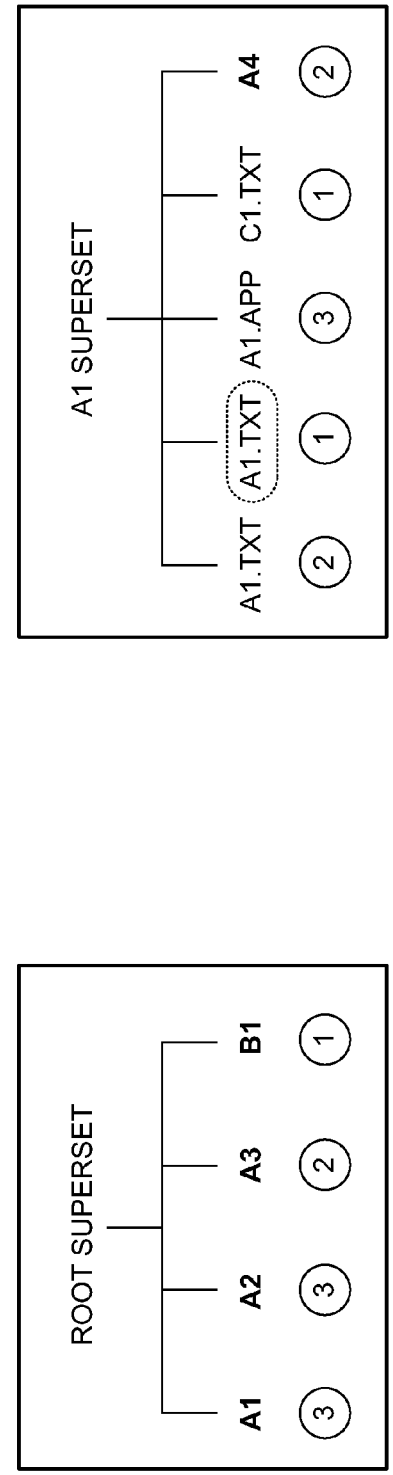

The superset of the root directories for Computer-A, Computer-B and Computer-C is illustrated schematically in FIG. 3B. As shown, directories A1 and A2 are present in all of the root file systems being compared (denoted by the circled 3). Directory A3 is present in two of the three root file systems (denoted by the circled 2), and directory B1 is in only one of the root file systems (denoted by the circled 1).

The superset of the A1 directories for Computer-A, Computer-B and Computer-C is illustrated schematically in FIG. 3C. As shown, one version of file A1.txt is present in two of the three A1 directories (denoted by the circled 2) while another version of file A1.txt is present in only one of the three A1 directories (denoted by the circled 1). Similarly, file A1.app is present in all three A1 directories (denoted by the circled 3), file C1.txt is present in only one of the A1 directories (denoted by the circled 1) and directory A4 is present in two of the three A1 directories (denoted by the circled 2).

Figure 4:
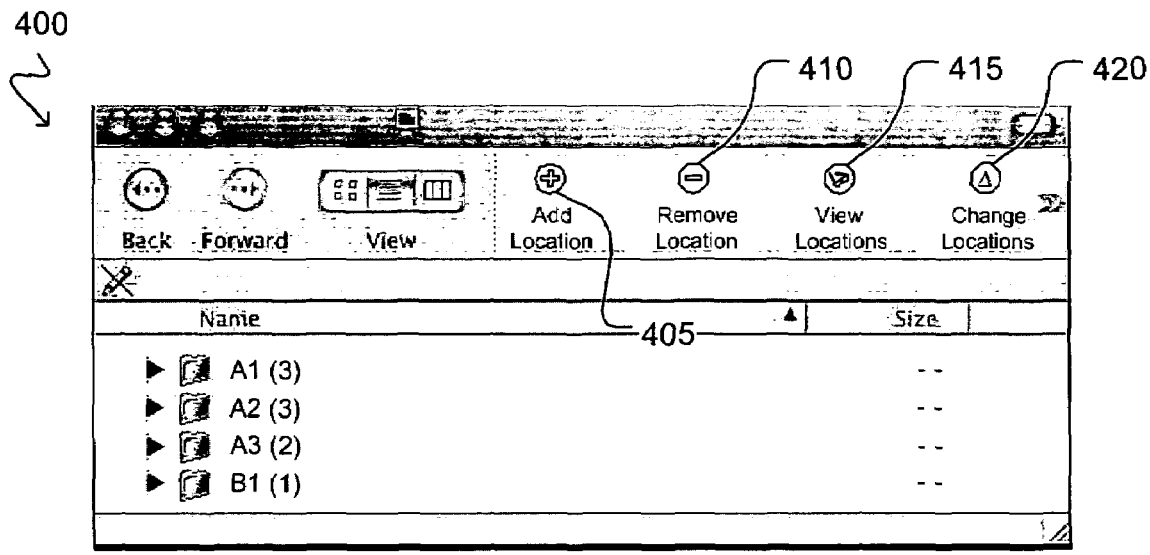
FIG. 4 shows a file browser application in accordance with one embodiment of the invention in which the root directory superset of computers A, B and C (see FIGS. 3A and 3B) is illustrated.

As illustrated in FIG. 4, file browser application 400 in accordance with one embodiment of the invention displays the root directory superset of computers A, B and C in an easy to interpret manner. As shown, each of the four directories identified in FIG. 3B is presented along with a notation of how many of the designated locations contain the displayed object in parenthesis. As used herein, the term "designated" means those locations in one or more file systems on one or more computer systems explicitly chosen by a user or implicitly chosen through default or application configuration parameters (e.g., a default location). As indicated above, in another embodiment, information concerning the overlap or uniqueness of displayed file objects may be indicated via color and/or through various icon or other graphical means. For example, those objects present in all of the designated locations (directories A1 and A2) may be displayed in a first color (e.g., green) while those objects present in only one of the designated locations (directory B1) may appear in a second color (e.g., black). Those objects present in more than one, but less than all, of the designated locations may be displayed in a third color (e.g., yellow). In another embodiment, a range of colors or shades may be used to indicate the number of locations a specific file object exists. In addition, specific information such as the location(s) in which each displayed object is present and other characteristics (e.g., size and ownership) may be obtained by selecting an object and issuing a "Get More Information" command, by a popup window when a pointer device is placed on over the object or by many other commonly used means to display information about a file object displayed in a graphical environment.

Referring again to FIG. 4, a user may designate locations within a file system to display via Add Location button 405 and may remove a previously designated file system locations via Remove Location button 410. For example, a user may want to view and compare the contents of the "root" directory on a first computer system with the "Applications" directory on a second and third computer system. A user may also view and compare the contents of a first location or locations with a cached image of a directory structure. That is, one or more of the designated locations may be images of a file structure or directory. A user may also view a list of locations already designated for viewing via button View Locations 415 and may change a previously designated location to a new location via Change Locations button 420. Each of buttons 405-420 may generate secondary windows or dialog boxes that prompt the user for information, to make choices (e.g., to navigate to a designated location) and to display information in any manner deemed appropriate for the user.

Figure 5:
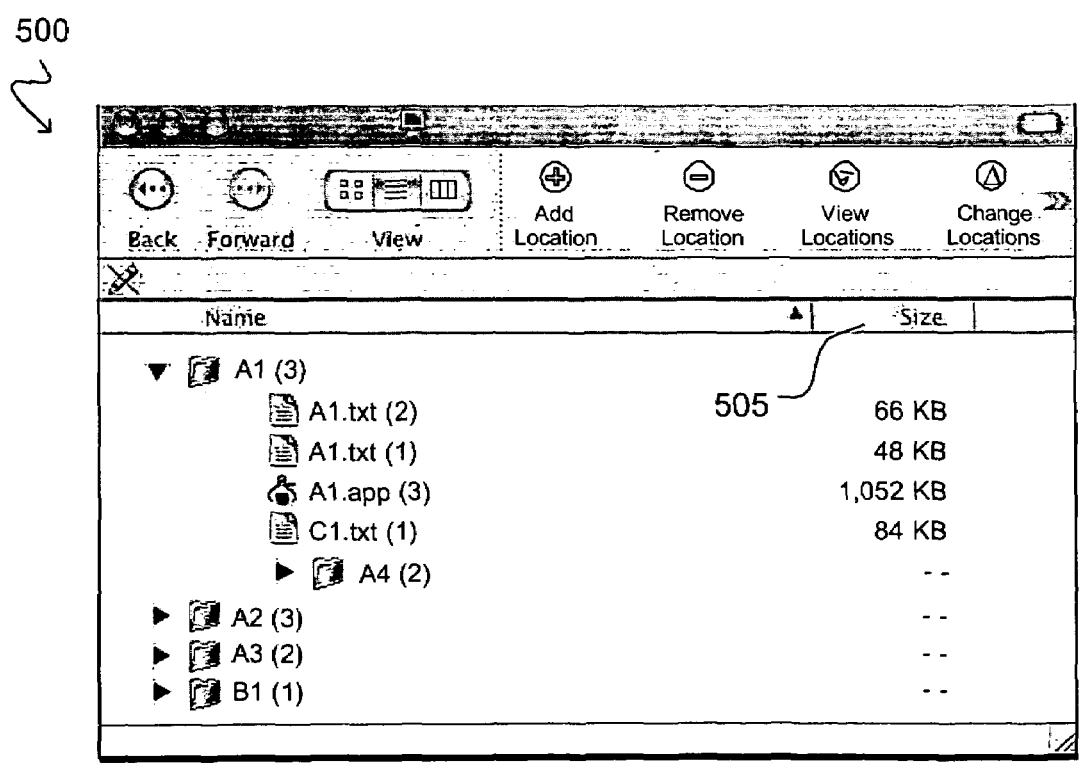
FIG. 5 shows the file browser application in accordance with FIG. 4 in which the superset of directory A1 of computers A, B and C (see FIGS. 3A and 3C) is illustrated.

FIG. 5 illustrates the superset display of directory A1 500 in accordance with the invention and corresponds to the information presented schematically in FIG. 3C. As shown, a first file A1.txt is present in two of the designated locations' A1 directories while another copy/version of file A1.txt is present in only one. As before, this distinction may be shown graphically using different colors, popup text or some other means as dictated by the particular implementation. In display 500, for example, size column 505 indicates that at least the size of each A1.txt file is different. (Additional information associated with each displayed object may be obtained as discussed above.) Display 500 further shows that file A1.app is present in three of the designated locations' A1 directories, file C1.txt is present in only one of the designated locations' A1 directory and that directory A4 is present in two of the designated locations' A1 directories.

Figure 1:
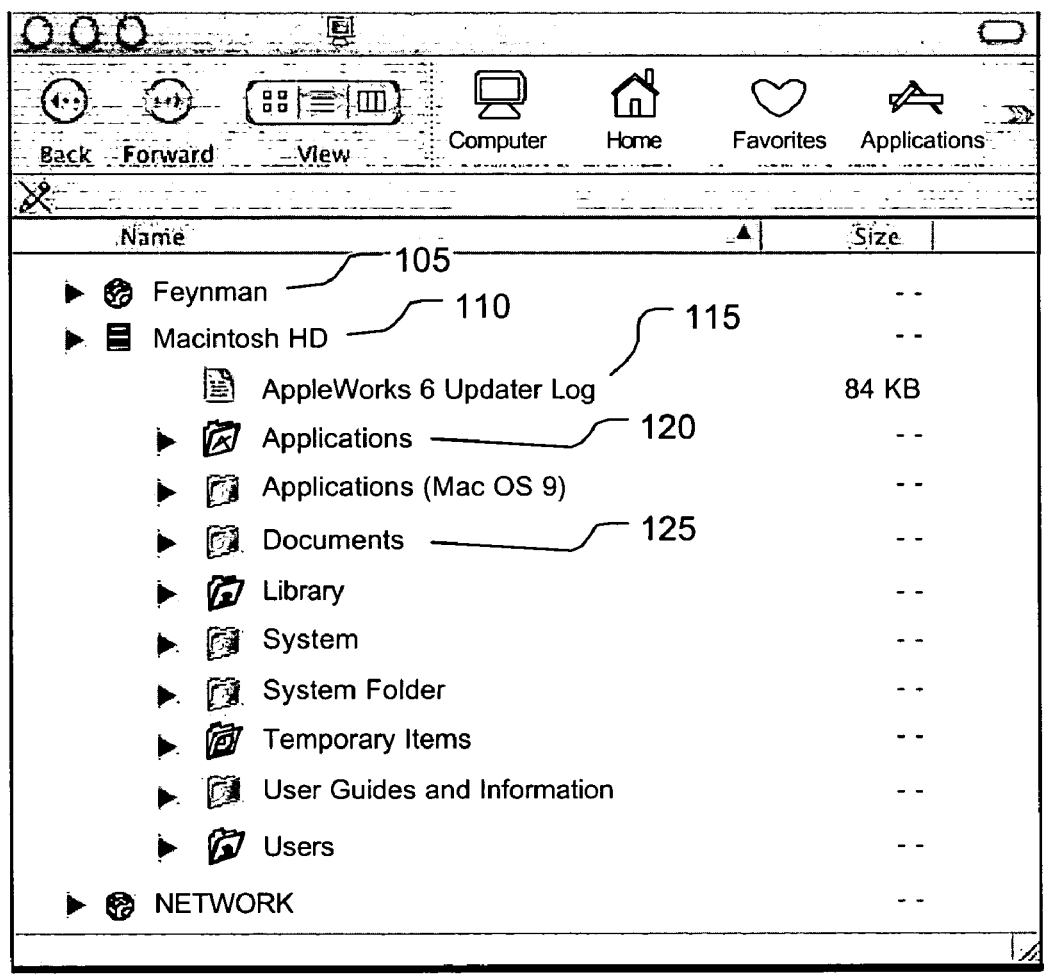
FIG. 1 shows a screen-shot one of one prior art file browser application.
Figure 2:
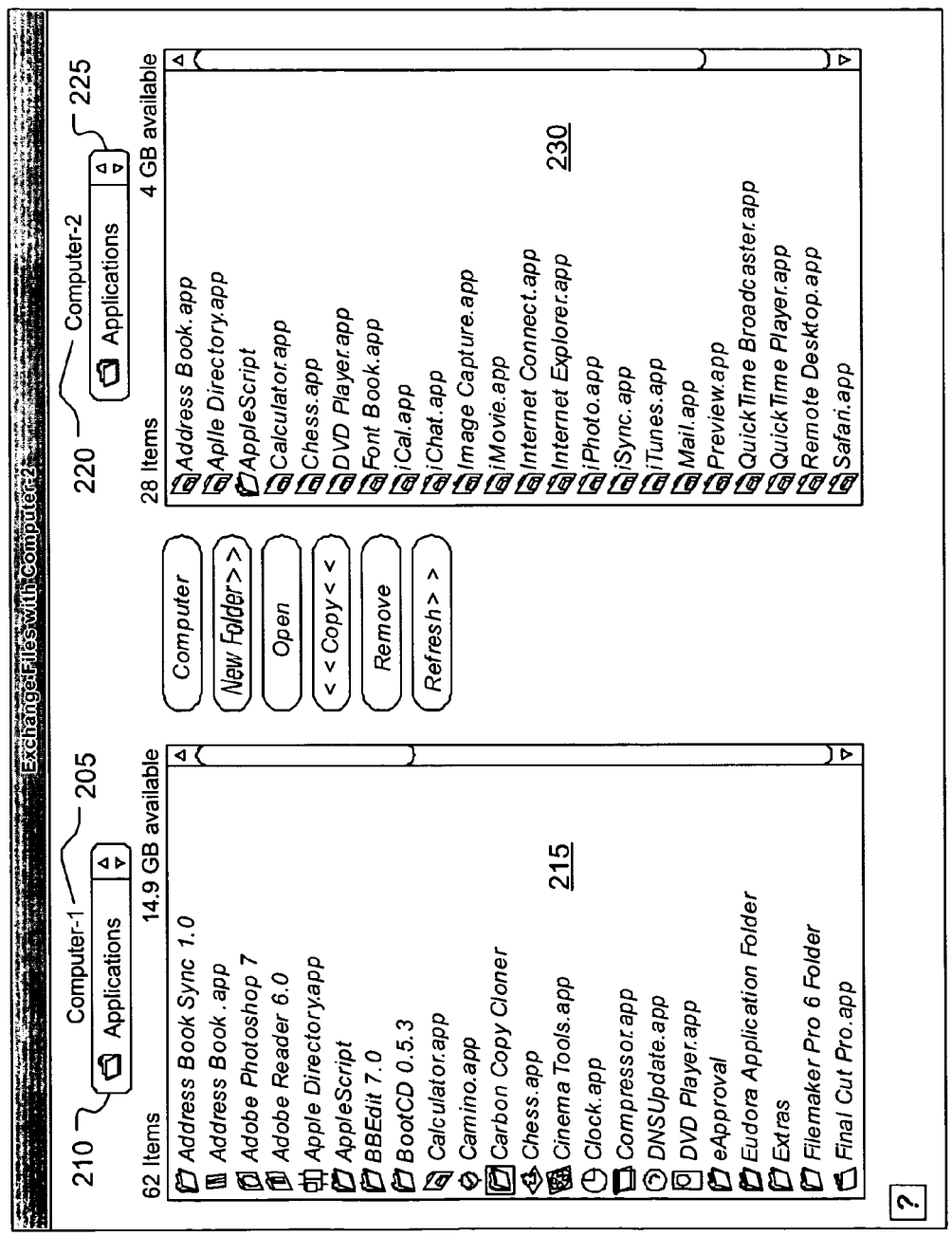
FIG. 2 shows a screen-shot of another prior art file browser application.
Figure 6:
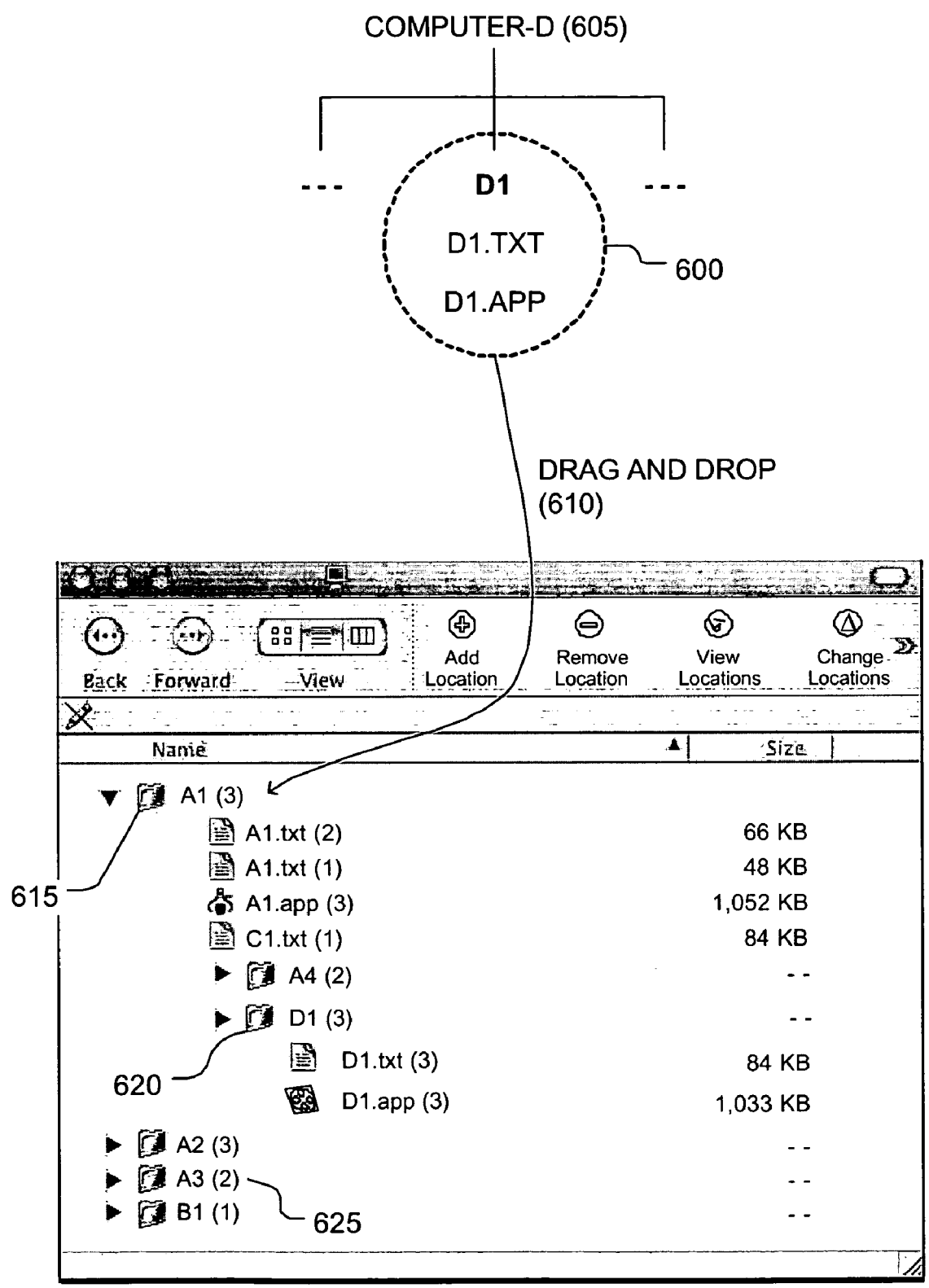
FIG. 6 shows a distribute operation in accordance with one embodiment of the invention.

In another embodiment of the invention, one or more files and/or directories may be distributed from a first location to each of the locations designated for display in a file browser in accordance with the invention. Referring to FIG. 6 for example, the contents of directory D1 600 on Computer-D 605 (such as a system administrator's desktop as viewed through a file browser application in accordance with FIG. 1), may be distributed to each designated location displayed in file browser application of FIG. 5 by selecting and dragging and dropping directory D1's icon (610) onto or into directory A1's icon 615. As shown, directory D1 600 and its contents are copied into each designated location displayed in the superset file browser application in accordance with the invention. This is noted in FIG. 6 by the parenthetical '3' associated with directory D1 620. In one embodiment, if the file object being moved is in a directory(ies) that is absent on any of the plurality of designated locations, they would be created on those client computer systems lacking them. For example, if directory D1 600 were dragged onto directory A3 625 in FIG. 6, directory D1 600 and its contents would be copied into each designated location having a directory A3 (e.g., Computer-A and Computer-C of FIG. 3A) and in addition, a directory A3 would be created in those designated locations not having a directory A3 (e.g., Computer-B of FIG. 3A), after which directory D1 and its contents would be copied into the newly created directory A3. In another embodiment, if the directory and/or file being moved into/onto a file browser application in accordance with the invention already exists at one or more of the designated locations, the "incoming" files (and directories) may be merged into the designated locations in accordance with one or more specified merge policies. Illustrative merge policies include, but are not limited to, overwriting older objects with newer objects or keeping all objects but amending their identifier (e.g., file name) to indicate their original source and/or creation time. In yet another embodiment, a distribute or move operation in accordance with the invention may be "pre-flighted," with results of the requested operation, should it be executed, presented to the user in a separate display so that she can determine whether the operation is one she wants to complete. In general, a user may specify which of a number of merge policies she wants to employ on a case-by-case basis (e.g., in those operations preflighted) or by setting a "user preference" for such operations through a menu command.

Figure 7:
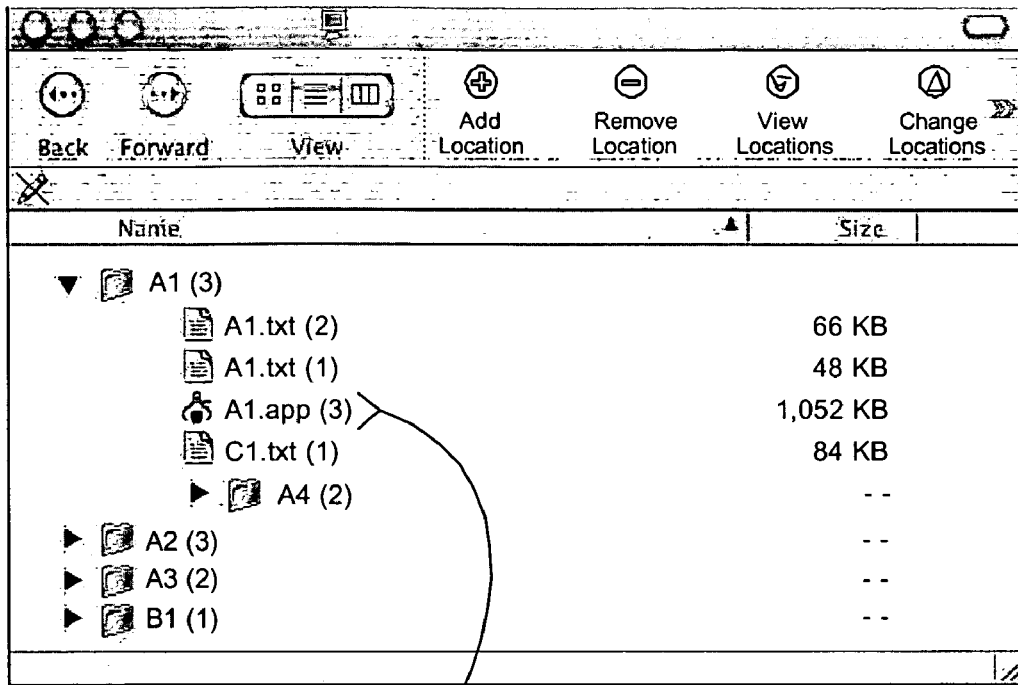
FIG. 7 shows a collection operation in accordance with one embodiment of the invention.
Figure 7:
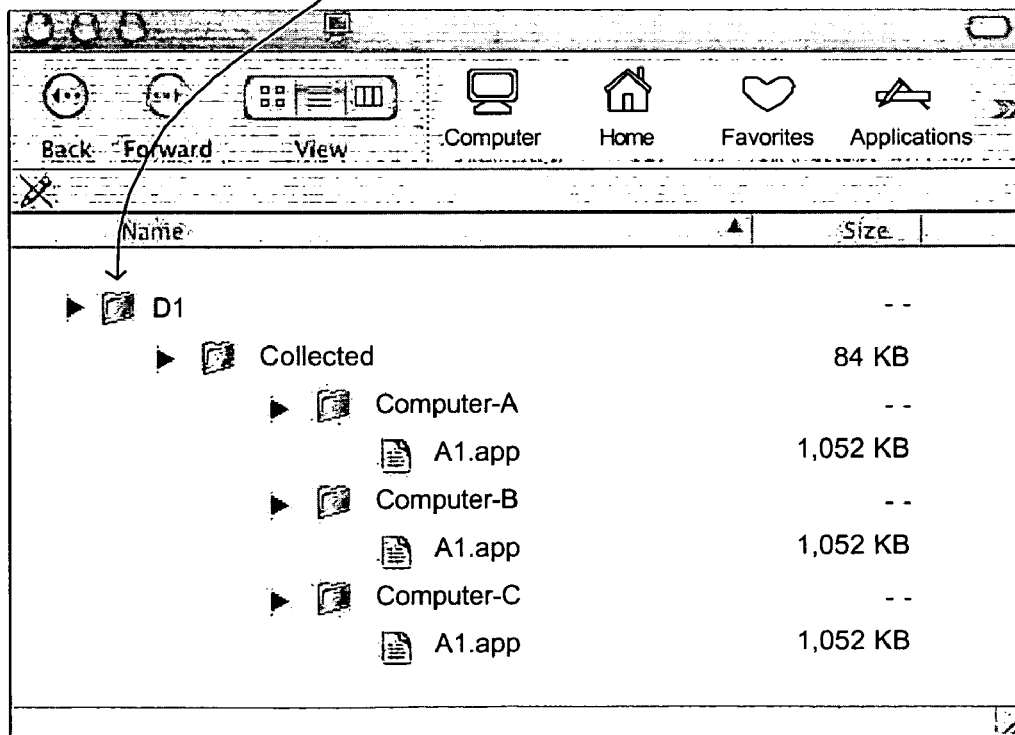

In an analogous fashion, a file browser application in accordance with the invention may be used to collect and transfer files from a plurality of locations to a single location. For example, by moving a single file object icon from a superset file browser application in accordance with the invention to a standard file browser application (of the type illustrated in FIG. 1, for example), a copy of the selected object from each of the locations in which it exists (from the designated locations displayed in the superset file browser application) may be made at the selected location. Referring to FIG. 7, if file object A1.app is selected in superset file browser application 500 and dragged onto the D1 directory icon (700) of Computer-D in standard file browser application 705, one method in accordance with the invention copies file A1.app from each of the locations it exists and organizes them by, for example, placing each copy in a directory whose name is taken from the name of the client computer system it was copied from. In another embodiment, all the copied files may be placed into a common directory and their file name would be modified to indicate their original source, e.g., Computer-A—A1.app or Computer-B—A1.app.

In still another embodiment of the invention, a file may be synchronized to all locations displayed in a file browser application in accordance with the invention through a single command action.

Figure 8:
FIG. 8 shows a synchronization operation in accordance with one embodiment of the invention.
Figure 8:

In one embodiment, synchronization or mirroring may be employed to make locations having different file objects the same, wherein each location is made to include the set union (superset) of the file objects on each of the various locations. In another embodiment, synchronization or mirroring may be used to force a first location to be like a second location, wherein only those files at the second location are permitted to exist at the first location. Referring to FIG. 8, for example, selecting directory A4 in superset file browser application 500 and issuing command 800 (e.g., through a menu or popup dialog box), causes directory A4 (including its contents) to be copied to the A1 directory in each of the superset file browser application's designated locations (e.g., Computer-A, Computer-B and Computer-C). This is noted in FIG. 8 by the parenthetical '3' associated with directory A4 805 in superset file browser application 810. As with other embodiments, color, icon or other visual distinctions may be used to designate the uniqueness or overlap status of individual display elements.

Figure 9:
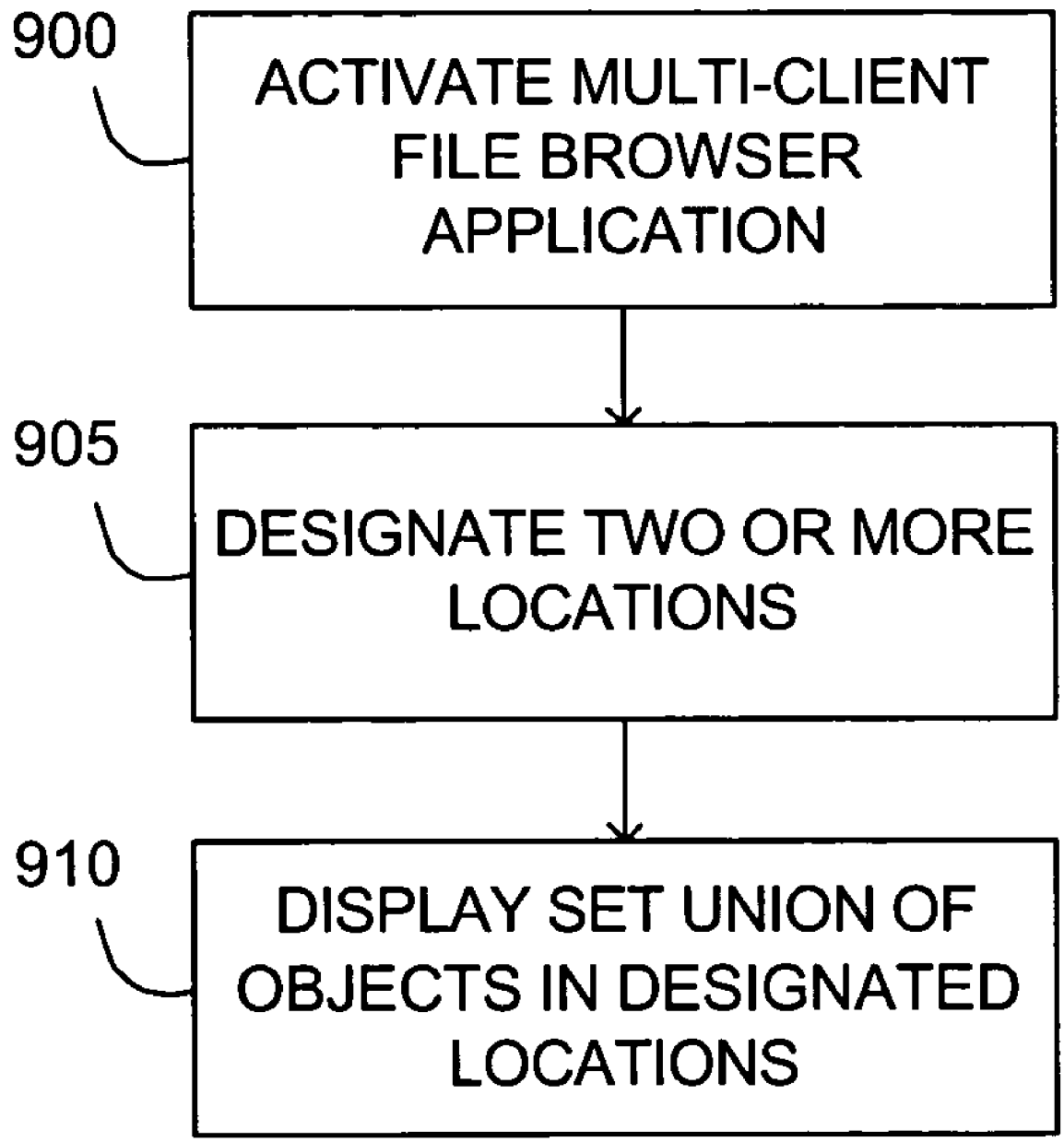
FIG. 9 shows a superset file browser method, in block diagram form, in accordance with one embodiment of the invention.

In summary, the operation of a superset file browser in accordance with the invention as illustrated in FIGS. 4 and 5 is shown in FIG. 9. Initially, a superset file browser application is initiated (block 900). The user then designates two or more locations on one or more client computer systems, local or remote (block 905). The superset, or set union, of all the file objects (including directories) in the designated locations are then presented in a single display (block 910). As noted above, the overlap an object has between the designated locations may be shown in any manner desired, or not at all. In one embodiment, a first color can identify those objects that are in each of the designated locations, a second color can identify those objects in only one of the designated locations and a third color can identify those objects in more than one, but less than all of the designated locations. In another embodiment, alphanumeric tags may be used to identify the uniqueness of the displayed objects between the various designated locations. In yet another embodiment, different icons may be used to identify object uniqueness. In still another embodiment, combinations of these techniques may be used. In addition, a pointer-device roll-over popup or other command may be used to provide the user with additional information about any specific displayed object. By way of example only, such additional information may include the names of the computer systems on which the displayed object exists, the size of the displayed object and the time the displayed object was created and/or modified. In addition to this superset display capability, a superset file browser in accordance with the invention permits one-to-many and many-to-many distribution, collection and synchronization operations as discussed above. It will further be recognized that the operations described herein to copy, collect and synchronize are special cases of a general ability to execute an arbitrary action against a selected file object. Other operations include, but are not limited to, open, delete and print.

One benefit of a file browser in accordance with the invention is that a user can easily identify files and directories that are common between designated locations and which files and directories are not common between the designated locations. This, in turn, can greatly reduce the amount of time it takes the user to configure a computer system. Another benefit of a file browser in accordance with the invention is that a single action can distribute, collect, synchronize or operate on files between a plurality of computer systems. Yet another benefit of a file browser in accordance with the invention is that it permits these operations on an essentially unlimited number of computer systems simultaneously.

While the invention has been disclosed with respect to a limited number of embodiments, numerous modifications and variations will be appreciated by those skilled in the art. For example, while the embodiments illustrated herein employ a tree-like file system representation, no such limitation applies to the invention. That is, the displayed objects need not be file objects stored in a hierarchical file system. By way of example, a file browser in accordance with the invention may be used to simultaneously view the contents of multiple devices (e.g., personal digital assistants and mobile phones) communicatively coupled through a personal area network. One illustrative personal area network is a network that conforms to the Institute of Electrical and Electronics Engineers 802.15 standard ("Bluetooth").

One of ordinary skill in the art will further recognize that directory structures such as those illustrated herein are often represented in a panel format, wherein successive layers in a hierarchical file system are represented by their own display panel. Nevertheless, such panels may be used to display the superset of file objects in accordance with the invention. It will also be appreciated that techniques in accordance with the invention are not limited to use by a system administrator, but may be used by any individual with sufficient computer system and network privileges to permit viewing and/or modification of a computer system's file system.

Finally, acts in accordance with FIG. 9, and as further illustrated in FIGS. 4-8, may be performed by a programmable control device executing instructions organized into a program module. A programmable control device may be a single computer processor, a plurality of computer processors coupled by a communications link, or a custom designed state machine. Storage devices suitable for tangibly embodying program instructions include, but not limited to: magnetic disks (fixed, floppy, and removable) and tape; optical media such as CD-ROM disks; digital video disks ("DVDs") and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A file browser method, comprising:
designating a plurality of file system locations, wherein each file system location is associated with zero or more file objects; and
displaying a superset of the file objects associated with each of the designated file system locations in a single display on a display unit.

2. The method of claim 1, wherein the act of designating is performed explicitly by a user.

3. The method of claim 1, wherein the file system comprises a hierarchical file system.

4. The method of claim 1, wherein the file system comprises a non-hierarchical file system.

5. The method of claim 1, wherein the act of designating comprises designating file system locations on at least two different computer systems.

6. The method of claim 5, wherein the act of designating file system locations on at least two different computer systems comprises designating file system locations on at least two different computer systems communicatively coupled by a digital network.

7. The method of claim 5, wherein the act of designating file system locations on at least two different computer systems comprises designating file system locations on at least two different computer systems communicatively coupled by a personal area network.

8. The method of claim 1, wherein the act of designating comprises designating a cached file structure image as a file system location.

9. The method of claim 1, wherein the act of displaying comprises identifying those file objects present in each of the designated file system locations in a first manner and those file objects present in only one of the designated file system locations in a second manner.

10. The method of claim 9, wherein the act of identifying file objects in a first manner comprises displaying said file objects in a first color and the act of identifying file objects in a second manner comprises displaying said file objects in a second color.

11. The method of claim 9, wherein the act of identifying file objects in a first manner comprises displaying said file objects using a first characteristic icon and the act of identifying file objects in a second manner comprises displaying said file objects using a second characteristic icon.

12. The method of claim 9, further comprising identifying those file objects present in more than one and less than all of the designated file locations in a third manner.

13. The method of claim 12, wherein the act of identifying file objects in a third manner comprises displaying said file objects in a third color.

14. The method of claim 12, wherein the act of identifying file objects in a third manner comprises displaying said file objects using a third characteristic icon.

15. The method of claim 1, wherein the act of displaying comprises visually distinguishing a first file object from a second file object based on the number of designated file system locations with which the first file object is associated compared to the number of the designated file system locations with which the second file object is associated with.

16. The method of claim 1, wherein the act of displaying comprises visually associating information tags with at least one of the displayed file objects.

17. The method of claim 16, wherein the act of visually associating information tags comprises visually associating one or more alphanumeric symbols with a displayed file object, the alphanumeric symbols identifying the number of designated file system locations associated with the file object.

18. The method of claim 1, further comprising:
selecting a displayed file object;
issuing a command against the selected file object; and
copying the selected file object to a specified location in each of the designated file system locations that it is not already associated with in response to the command.

19. The method of claim 1, further comprising:
selecting a file object displayed in a non-superset file-browser;
graphically dragging and dropping the selected file object to a specified location in the designated file system locations; and
copying the selected file object to the specified location in each of the designated file system locations in response to the act of dragging and dropping.

20. The method of claim 19, wherein the act of copying comprises copying the selected file object in accordance with a specified merge policy.

21. The method of claim 20, wherein the specified merge policy comprises a write-over merge policy.

22. The method of claim 20, wherein the specified merge policy comprises a copy-the-latest file object merge policy.

23. The method of claim 1, further comprising:
selecting a displayed file object;
graphically dragging and dropping the selected file object to a non-superset file browser; and
creating multiple copies of the file objects represented by the selected file object in response to the act of dragging and dropping, wherein each created copy duplicates the file object represented by the selected file object in each designated location the file object is located.

24. The method of claim 23, wherein the act of creating multiple copies further comprises organizing each created copy in a separate directory, said directory indicating the designated location from which the copy was created.

25. A computer readable storage device comprising instructions for causing a computer to permit a user to:
designate a plurality of file system locations, wherein each file system location is associated with zero or more file objects; and
display the superset of the file objects associated with each of the file system locations in a single display.

26. The storage device of claim 25, wherein the instructions to designate a plurality of file system locations comprise instructions to permit a user to explicitly designate said plurality of file system locations.

27. The storage device of claim 25, wherein the instructions to designate a plurality of file system locations comprise instructions to select one or more default file system locations.

28. The storage device of claim 25, wherein the instructions to designate comprise instructions to designate file system locations on at least two different computer systems.

29. The storage device of claim 25, wherein the instructions to designate comprise instructions to designate a cached file structure image as a file system location.

30. The storage device of claim 25, wherein the instructions to designate comprise instructions to designate a non-hierarchical file system location.

31. The storage device of claim 25, wherein the instructions to display comprise instructions to identify those file objects present in all of the designated file system locations in a first manner and those file objects present in only one of the designated file system locations in a second manner.

32. The storage device of claim 31, wherein the instructions to identify file objects in a first manner comprise instructions to display said file objects in a first color and the instructions to identify file objects in a second manner comprise instructions to display said file objects in a second color.

33. The storage device of claim 31, further comprising instructions to identify file objects present in more than one and less than all of the designated file locations in a third manner.

34. The storage device of claim 33, wherein the instructions to identify file objects in a third manner comprise instructions to display said file objects in a third color.

35. The storage device of claim 25, wherein the instructions to display comprise instructions to visually associate information tags with at least one of the displayed file objects.

36. The storage device of claim 35, wherein the instructions to visually associate information tags comprise instructions to visually associate one or more alphanumeric symbols with a displayed file object, the alphanumeric symbols identifying the number of designated file system locations associated with the file object.

37. The storage device of claim 25, further comprising instructions to:
permit a user to select a displayed file object;
permit the user to issue a command against the selected file object; and
copy the selected file object to a specified location in each of the designated file system locations that it is not already associated with in response to the command.

38. The storage device of claim 25, further comprising instructions to:
permit a user to select a file object displayed in a non-superset file-browser;
permit the user to graphically drag and drop the selected file object to a specified location in the designated file system locations; and
copy the selected file object to the specified location in each of the designated file system locations in response to the drag and drop operation.

39. The storage device of claim 38, wherein the instructions to copy comprise instructions to copy the selected file object in accordance with a specified merge policy.

40. A computer system, comprising:
a central processing unit;
a memory operatively coupled to the central processing unit;
a computer network connection operatively coupled to the central processing unit;

a display unit operatively coupled to the central processing unit and the memory; and a storage device, operatively coupled to the central processing unit and the memory, said storage device having instructions stored thereon for causing the central processing unit to:

display, on the display unit, a file-browser application, designate a plurality of file system locations, wherein each file system location is associated with zero or more file objects, and display, in the file-browser application, a superset of the file objects associated with each of the file system locations.

41. The computer system of claim 40, wherein the instructions to designate comprise instructions to designate file system locations on at least two different computer systems.

42. The computer system of claim 40, wherein the instructions to designate comprise instructions to designate a non-hierarchical file system location.

43. The computer system of claim 40, wherein the instructions to designate comprise instructions to require a user to explicitly designate at least one of the plurality of file system locations.

44. The computer system of claim 40, wherein the instructions to display comprise instructions to graphically identify those file objects present in all of the designated file system locations in a first manner and all those file objects present in only one of the designated file system locations in a second manner.

45. The computer system of claim 44, further comprising instructions to graphically identify those file objects present in more than one of the designated file locations and less than all of the designated file locations in a third manner.

46. The computer system of claim 40, wherein the instructions to display comprise instructions to visually associate information tags with at least one of the displayed file objects.

47. The computer system of claim 40, further comprising instructions to:

permit a user to select a displayed file object;

permit the user to issue a command against the selected file object; and copy the selected file object to a specified location in each of the designated file system locations that it is not already associated with in response to the command.

48. The computer system of claim 40, further comprising instructions to:

permit a user to select a file object displayed in a second file-browser;

permit the user to graphically drag and drop the selected file object to a specified location in the designated file system locations; and copy the selected file object to the specified location in each of the designated file system locations in response to the drag and drop operation.

49. In a computer network of a type including at least two devices, wherein each device presents a file system, each of said file systems comprising one or more locations, each of said one or more locations associated with zero or more file system objects, a method for displaying a superset of file system objects, comprising:

specifying a file system location on each of the at least two devices; and displaying the set union of the file system objects located at each of the specified file system locations.

50. The method of claim 49, wherein the act of specifying comprises a user specifying at least one of the file system locations explicitly.

51. The method of claim 49, wherein the act of specifying comprises using a default location in at least one of the at least two file systems.

52. The method of claim 49, wherein at least one of the specified file system locations comprises a location in a hierarchically organized file system.

53. The method of claim 49, wherein at least one of the specified file system locations comprises a location in a non-hierarchically organized file system.

54. The method of claim 49, wherein the computer network comprises a personal area network.

55. The method of claim 49, wherein the act of specifying comprises specifying a cached file structure image as a file system location.

56. The method of claim 49, further comprising:

selecting a file system object from the displayed set union of file system objects; and copying the selected file system object to a designated location in each of the specified file system locations that it is not already associated with.

57. The method of claim 49, further comprising:

selecting a file system object displayed in accordance with a non-superset file-browser application;

graphically dragging and dropping the selected file system object to a designated location in the displayed set union of file system objects; and copying the selected file system object to the designated location in each of the specified file system locations.

58. The method of claim 57, wherein the act of copying comprises copying the selected file system object in accordance with a merge policy.

59. The method of claim 49, further comprising:

displaying a file system location in a non-superset file-browser application;

selecting a file system object from the displayed set union of file system objects;

graphically dragging and dropping the selected file system object onto the file system location displayed in the non-superset file-browser application; and creating multiple copies of the selected file system object at the file system location displayed in the non-superset file-browser application, wherein each created copy duplicates an object represented by the selected file system object in each specified location the file system object is located.

60. The method of claim 59, wherein the act of creating the multiple copies further comprises organizing each created copy in a separate directory, said directory indicating the specified location from which the copy was created.

61. The method of claim 49, wherein the act of displaying comprises visually distinguishing a first file system object from a second file system object based on the number of the specified file system locations the first file system object is associated with relative to the number of the specified file system locations the second file system object is associated with.

62. The method of claim 49, wherein the act of displaying comprises visually associating information tags with at least one of the displayed file system objects.

63. The method of claim 49, wherein the act of displaying file system objects comprises displaying an icon representing a file object.

64. The method of claim 63, wherein the act of displaying file system objects further comprises displaying an icon representing a directory object.

65. A computer readable program storage device comprising instructions stored therein for causing a computer to:

specify a file system location on each of at least two computers; and display the set union of file system objects located at each of the specified file system locations.

66. The program storage device of claim 65, wherein at least one of the file system locations comprise a hierarchically organized file system.

67. The program storage device of claim 65, wherein at least one of the file system locations comprise a non-hierarchically organized file system.

68. The program storage device of claim 65, wherein the instructions to specify comprise instructions to permit a user to explicitly designate at least one file system location.

69. The program storage device of claim 65, wherein the instructions to specify comprise instructions to use at least one default file system location.

70. The program storage device of claim 65, further comprising instructions to:

permit a user to select a file system object from the displayed set union of file system objects; and copy the selected file system object to a designated location in each of the specified file system locations that it is not already associated with.

71. The program storage device of claim 65, further comprising instructions to:

permit a user to select a file system object displayed in accordance with a non-superset file-browser application;

permit the user to graphically drag the selected file system object to a designated location in the displayed set union of file system objects; and copy the selected file object to the designated location in each of the specified file system locations.

72. The program storage device of claim 71, wherein the instructions to copy comprise instructions to copy the selected file object in accordance with a merge policy.

73. The program storage device of claim 65, further comprising instructions to:

display a file system location in a non-superset file-browser application;

permit a user to select a file system object from the displayed set union of file system objects;

permit the user to graphically drag and drop the selected file system object onto the file system location displayed in the non-superset file-browser application; and create multiple copies of the selected file system object at the file system location displayed in the non-superset file-browser application, wherein each created copy duplicates an object represented by the displayed file system object in each specified location the file system object is located.

74. The program storage device of claim 73, wherein the instructions to create the multiple copies further comprise instructions to organize each created copy in a separate directory, said directory indicating the specified file system location from which the copy was created.

75. The program storage device of claim 65, wherein the instructions to display comprise instructions to visually distinguish a first file system object from a second file system object based on the number of the specified file system locations the first file system object is associated with relative to the number of the specified file system locations the second file system object is associated with.

76. The program storage device of claim 65, wherein the instructions to display comprise instructions to visually associate information tags with at least one of the displayed file system objects.

* * * * *